Patented Nov. 22, 1938

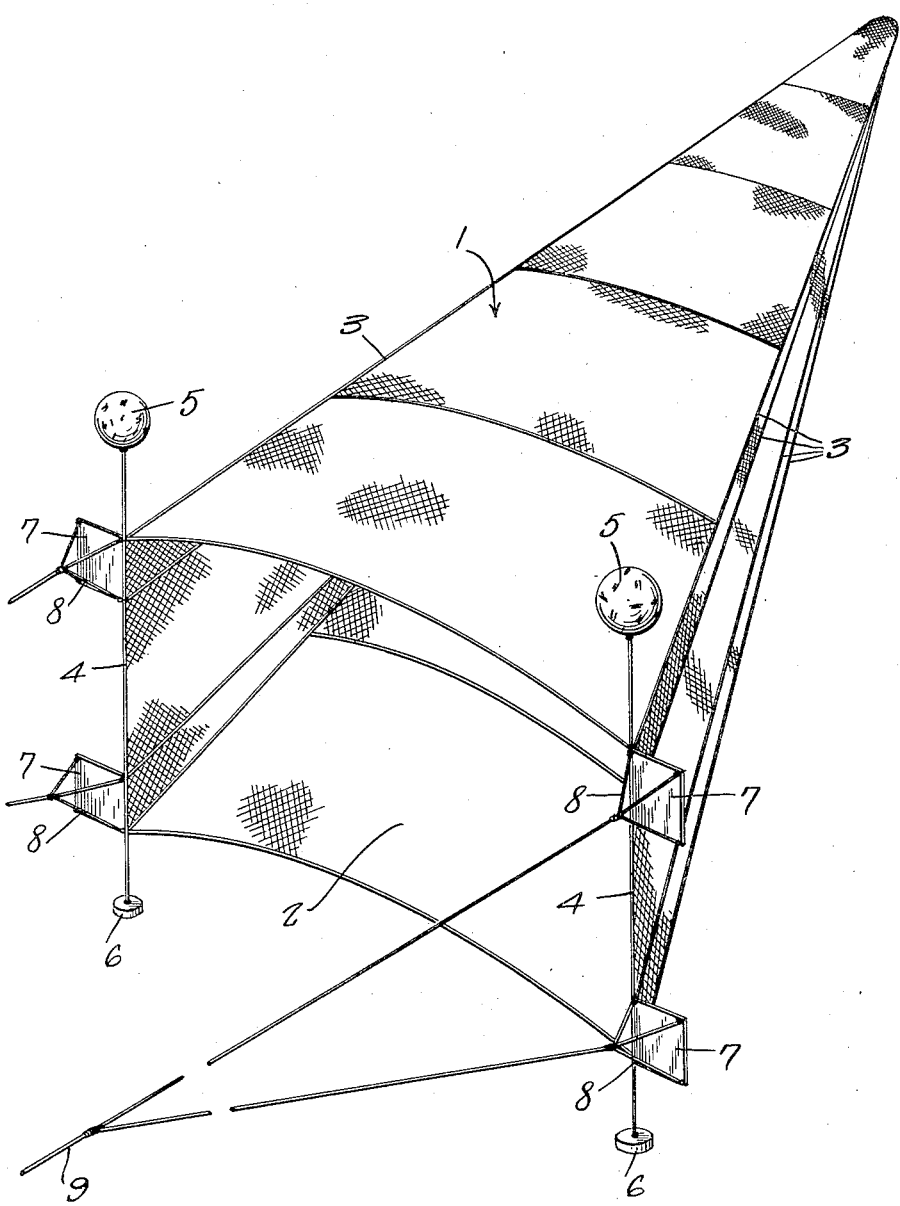

2,137,663

UNITED STATES PATENT OFFICE 2,137,663

TRAWL NET

Charles A. Aspenburg, Wildwood, N. J.

Application September 28, 1937, Serial No. 166,213

1 Claim. (Cl. 43—9)

This invention relates to trawl nets and has for the primary object the provision of a device of this character which may be successfully towed by two vessels paralleling each other and the device is so constructed that it will travel closer to the surface of the water than nets of a similar construction and is equipped with means for preventing the doors of the net from upsetting while said net is being towed.

With these and other objects in view, this invention consists in certain novel features of construction, combination and arrangement of parts to be hereinafter more fully described and claimed.

For a complete understanding of my invention, reference is to be had to the following description and accompanying drawing, in which The figure is a perspective view illustrating a trawling net constructed in accordance with my invention.

Referring to the drawing in detail, the numeral 1 indicates the walled body of my net which is open at its front end to form a mouth 2 and tapers from said end toward its opposite or rear end, as shown. Extending longitudinally of the side walls of the body, in pairs at the upper and lower portions thereof are core lines 3 which are attached to float and weight lines 4, the latter being secured to and arranged at the opposite sides of the mouth 2. Floats 5 are secured to the upper ends of the lines 4, while weights 6 are secured to the lower ends thereof, for holding the lines 4 perpendicular as will be apparent upon inspection of the drawing.

Doors 7 are located at the opposite sides of the mouth 2, one at each corner thereof, and each door has one of its edges attached to a line 4 and coincident therewith, while the core lines 3 which are secured to the lines 4 adjacent the upper and lower ends of the attached edges of the doors, extend toward the rear end of the net body in converging relation. Bridles 8 are secured to the doors at the corners thereof, and fastened to the bridles are tow lines 9, which are adapted to be fastened to separate towing vessels paralleling one another, for towing the net through the water, as will be apparent.

From the foregoing and the disclosure of the drawing, it will be obvious that the arrangement of the core lines and their connection with respect to the doors is of extreme importance, in that the core lines set up a counter-resistance against the pulling force of the tow lines, and thereby cooperate with the floats and weights to prevent the doors from upsetting as well as to retain the same in proper position at an outward angle with respect to the mouth, to keep the latter completely open at all times, while the net is being towed. It will be further obvious that the arrangement of the core lines, doors, floats and weights cause the net to travel closer to the surface of the water than other types of nets of this character, which tend to sink a considerable distance below the surface of the water for movement along the bottom.

What is claimed is:

A trawling net comprising a walled net body tapering inwardly from the front to the rear end thereof, and the front end being open to provide a mouth, lines fastened to said body at the opposite sides of the mouth, floats secured to the upper ends of said lines, weights secured to the lower ends thereof and cooperating with the floats in supporting the lines substantially perpendicular, a door at each end of the opposite sides of the mouth, each door having one of the edges thereof secured to and coincident with a line, spaced pairs of core lines having their forward ends fixed to the first lines and extending longitudinally of the body in converging relation from the upper and lower ends of said edges of the doors, and toward the rear end of the body, bridles fastened to said doors, and tow lines connected to the bridles.

CHARLES A. ASPENBURG.